R. SCHÄFER.
DEVICE FOR OPERATING THE JAWS OF SPANNERS AND THE LIKE.
APPLICATION FILED APR. 28, 1920.
1,382,247. Patented June 21, 1921.
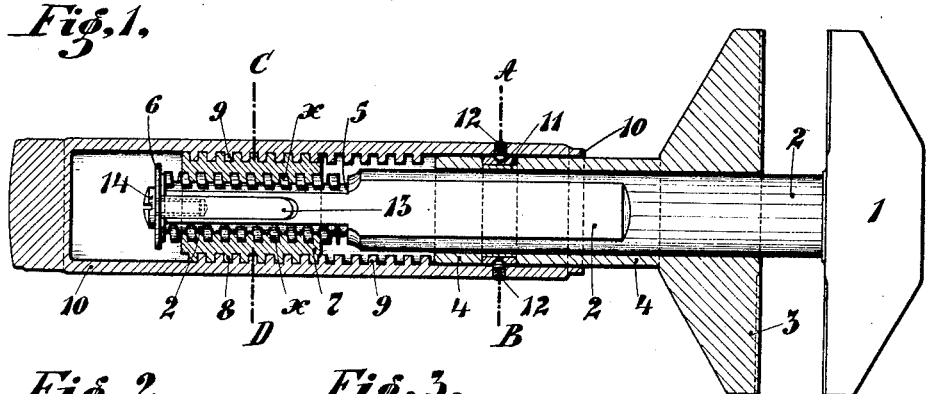
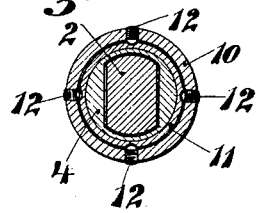
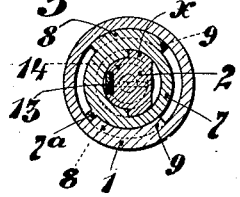
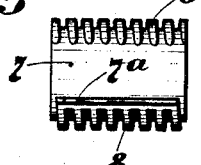
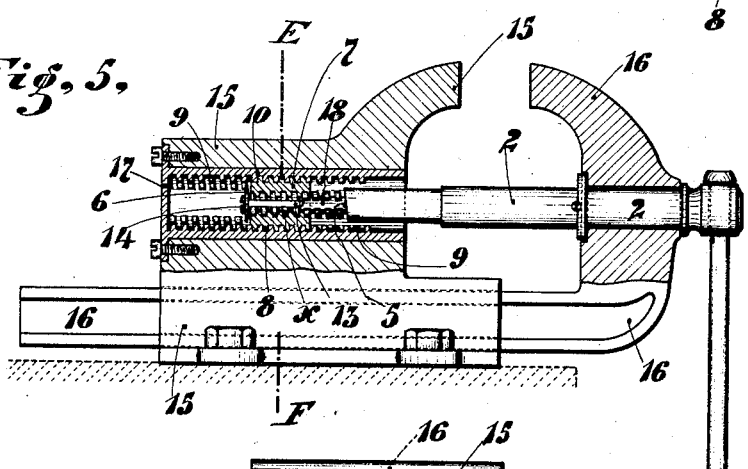
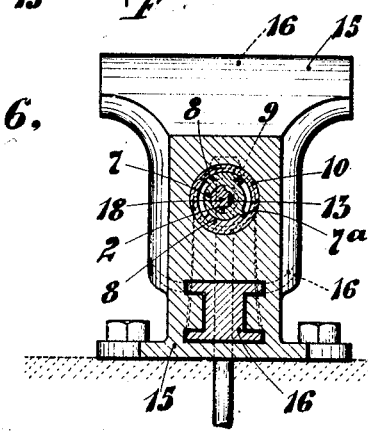
Inventor:
Robert Schäfer

UNITED STATES PATENT OFFICE.

ROBERT SCHÄFER, OF ERFURT, GERMANY.

DEVICE FOR OPERATING THE JAWS OF SPANNERS AND THE LIKE.

1,382,247. Specification of Letters Patent. Patented June 21, 1921.

Application filed April 28, 1920. Serial No. 377,356.

*To all whom it may concern:*

Be it known that I, ROBERT SCHÄFER, a citizen of the German Republic, residing at Erfurt, Germany, have invented certain new and useful Improvements in Devices for Operating the Jaws of Spanners and the like, of which the following is a specification.

For the rapid adjustment of the jaws of spanners and the like, such tools are sometimes provided with a sleeve controlling one jaw and having an internal interrupted screw-thread coöperating with a corresponding interrupted screw-thread on the shank or other controlling element of the other jaw so that a free adjustment of the jaws can take place in one position of rotary displacement of the sleeve relative to the shank.

The present invention relates to a device of this kind for use with spanners, vises and the like, and consists in the provision between the sleeve and the shank or, in the case of vises, the screw-spindle, of a nut having an external interrupted thread to coöperate with the sleeve and an internal complete thread to coöperate with the shank or spindle. This arrangement gives considerable scope of adjustment. The nut is braked to the shank or spindle by means of a spring and has a stop which limits its rotary adjustment relative to the sleeve.

In the accompanying drawings the invention is illustrated in conjunction with a spanner as well as with a vise, Figure 1 representing a longitudinal section of the spanner, Fig. 2, a cross-section of the same on the line A—B of Fig. 1, Fig. 3, a cross-section on the line C—D of Fig. 1, and Fig. 4, a side view of the nut.

Fig. 5 is a sectional side view of the vise, and

Fig. 6, a cross-section on the line E—F of Fig. 5.

The spanner is provided, in known manner, with a hollow shank 4 formed with a jaw 3 and within which another shank 2, formed with a jaw 1, is slidably arranged, part of the shank 2 and of the bore in the shank 4 being flattened, as shown in Fig. 2, to prevent rotary displacement of these elements. A handle-sleeve 10 is in rotary connection with the shank 4. This connection is effected by means of a ring 11 fitting a circular groove around the shank 4 and connected by means of set-screws 12 to the sleeve 10.

The shank 2 has at its free end a screw-thread $x$ on which is fitted a nut 7, the latter being a few threads shorter than the screw-threaded portion of the shank. A washer 6, held against the end of the shank 2 by a screw 14, limits the motion of the nut in one direction, and a shoulder 5 on the shank, in the other direction. The nut has also an external screw-thread 8 which is interrupted and which fits a corresponding interrupted thread 9 in the sleeve 10, the arrangement being such that the nut is free to move axially in the sleeve in one position and prevent it from such motion in another position of relative rotary adjustment. The nut 7 has a stop 7ᵃ which, by abutment against the interrupted thread of the sleeve 10, limits the relative rotary displacement of the two elements. A spring 13, arranged between the shank 2 and the nut 7 and connected to the former, acts as a brake and opposes the rotary displacement of the nut relative to the shank. When the sleeve 10 is turned about the shank 4, therefore, the nut 7 remains unaffected until the stop 7ᵃ is engaged by the thread. Further rotation of the sleeve causes the nut to be turned and the jaws to be forcibly approached or separated. When the nut is disengaged from the sleeve, the jaws can be rapidly adjusted to the work to within the width of one screw-thread, the forcible application of the jaws being effected by a turning of the nut by means of the sleeve.

The ends of the threads 8 are rounded off, as shown in Fig. 4, to facilitate their entrance between the threads of the sleeve.

In the case of a vise, the arrangement is identical with the foregoing one, the only difference being that the sleeve 10 is firmly secured to the rigid jaw 15 (Fig. 5). The shank 2 takes the form of the screw-spindle which controls the movable jaw 16 in the usual manner. The screw-spindle is first turned for moving the nut into position for rapid adjustment and then for forcing the jaws to the work.

I claim:—

1. A device for operating the jaws of spanners and the like, comprising the combination with an internally screw-threaded sleeve connected to one jaw, of a nut having external as well as internal screw-thread fitted in said sleeve, the thread of the sleeve and the external thread of the nut being equal and interrupted so as to allow free axial relative displacement of the elements in one position and prevent such displacement in another position of relative rotary adjustment, a controlling element for the other jaw having a screw-threaded portion in engagement with the internal thread of the nut, a stop limiting the rotary displacement of the nut relative to the sleeve, and a brake-spring between said controlling element and the nut opposing the relative rotary displacement of these latter elements so that the rotary adjustment of the nut relative to the sleeve and of the controlling element relative to both can be effected by the operation of the same element, substantially as and for the purpose set forth.

2. In a spanner of the character described, the combination with a jaw sliding upon the shank of another jaw, and with a sleeve having an internal interrupted screw-thread and being in rotary connection with the slidable jaw, of a nut, having external as well as internal thread, arranged between the sleeve and the shank, the external thread of the nut being interrupted and capable of coöperating with the thread in the sleeve to allow free axial relative displacement of these elements in one position and prevent such displacement in another position of relative rotary adjustment, the shank having a screw-threaded portion engaging the internal thread of the nut, a stop limiting the rotary displacement of the nut relative to the sleeve, and a brake-spring between the shank and the nut opposing the relative rotary displacement of these latter elements, substantially as set forth.

ROBERT SCHÄFER.

Witnesses:
 ALBIN KLEIN,
 PONZ KLOPPEL.